United States Patent [19]

Curtin

[11] Patent Number: 4,567,330

[45] Date of Patent: Jan. 28, 1986

[54] INTERFACE FOR CONNECTING STANDARD TELEPHONES TO PARTY LINES

[75] Inventor: Leonard E. Curtin, Houston, Tex.

[73] Assignee: Harris Corporation, Melbourne, Fla.

[21] Appl. No.: 620,735

[22] Filed: Jun. 14, 1984

[51] Int. Cl.[4] .......................... H04M 1/00; H04Q 5/00
[52] U.S. Cl. ............................... 179/17 E; 179/84 R; 179/18 HB
[58] Field of Search .............. 179/17 E, 18 HB, 27 E, 179/28, 51 AA, 84 SS, 84 T, 86, 84 R, 84 A, 17 A, 17 B

[56] References Cited

U.S. PATENT DOCUMENTS

| | | | |
|---|---|---|---|
| 3,626,106 | 12/1971 | Greening et al. | 179/18 AD |
| 3,689,705 | 9/1972 | Pinede et al. | 179/17 E |
| 4,081,609 | 3/1978 | Beene et al. | 179/2.5 R |
| 4,282,410 | 8/1981 | Gauthier et al. | 179/84 R |
| 4,406,004 | 9/1983 | Hall et al. | 370/15 |
| 4,477,697 | 10/1984 | Judd et al. | 179/84 T |
| 4,528,424 | 7/1985 | Middleton et al. | 179/17 A |

Primary Examiner—Gene Z. Rubinson
Assistant Examiner—Elio Di Vito
Attorney, Agent, or Firm—Antonelli, Terry & Wands

[57] ABSTRACT

A party line interface for permitting connection of a standard two-wire telephone designed for non-party line use to a party line system which rings subscribers by party line ringing signals of different frequencies. The interface includes circuitry for generating a ring command signal in response to the receipt of a party line ringing signal of a specified single frequency chosen from the group of possible ringing frequencies of the party line. The party line ringing frequency to which the circuitry for generating the ring command signal responds is programmable to permit selection of the particular party line ringing frequency to which the ring command signal will be generated in response thereto. Circuitry is provided for producing a ringing signal of a standard frequency designed to ring a standard telephone in response to the ring command signal.

13 Claims, 6 Drawing Figures

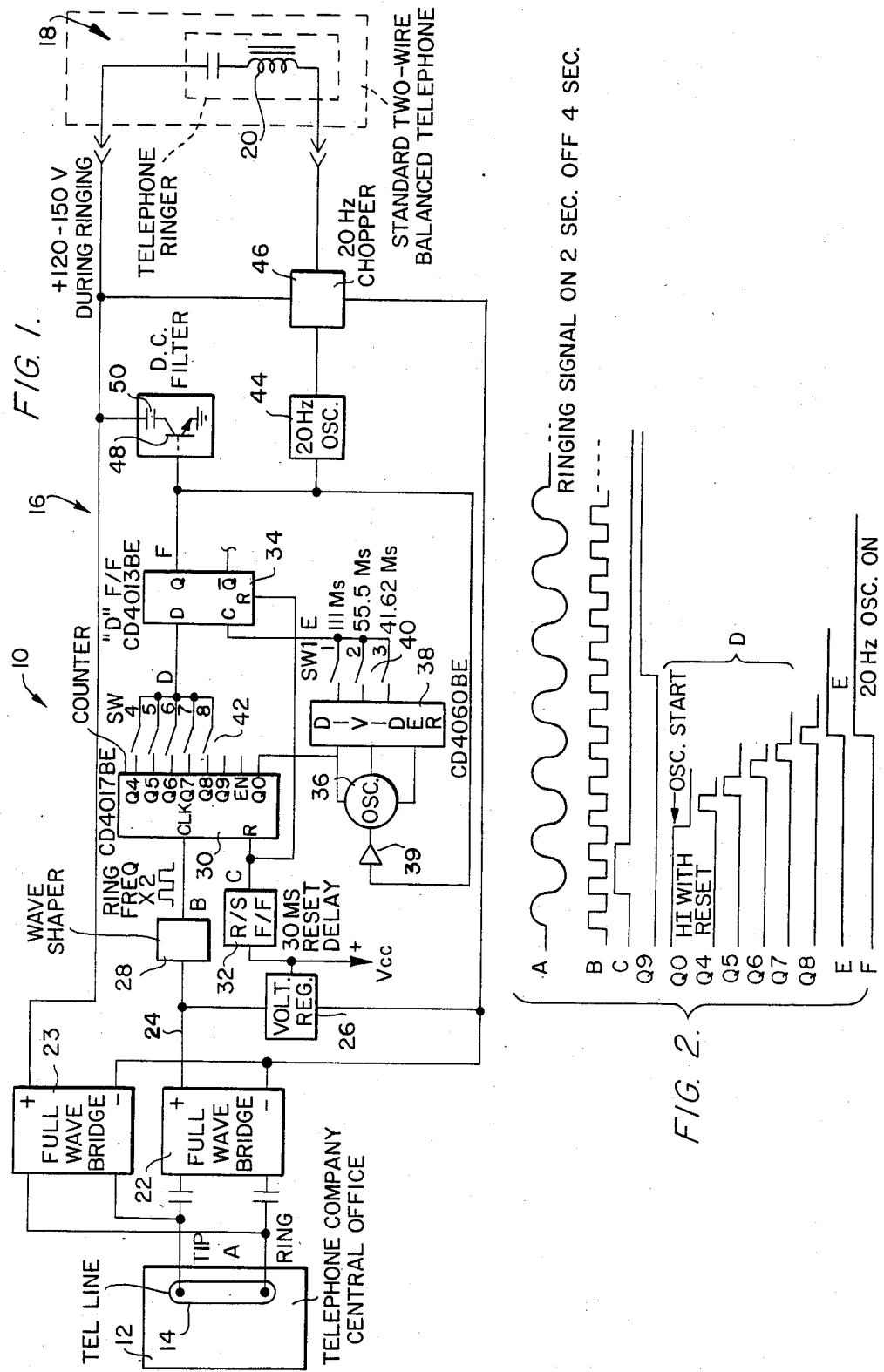

INTERFACE FOR CONNECTING STANDARD TELEPHONES TO PARTY LINES

BACKGROUND OF THE INVENTION

1. Field of the Invention

The invention relates to circuits which permit the connection of a telephone designed for non-party line use to a party line of the type which selectively rings subscribers by the generation of any one of a plurality of specified ringing frequencies.

2. Description of the Prior Art

Telephone companies have developed party line service which selectively rings different subscribers assigned to a single line by the generation of a single ringing frequency assigned to each telephone subscriber. Each subscriber's telephone is provided with a ringing circuit which is tuned to resonate at the particular ringing frequency which had been assigned to that customer. The tuning of the subscriber's ringing circuit to resonate at a particular ringing frequency automatically rejects other ringing frequencies. With the party line service of the frequency selective type as set forth above, it is necessary for the telephone company to provide each subscriber with a telephone with a properly tuned ringing circuit to respond to the party line ringing frequency assigned to the subscriber by the telephone company central office. Party line telephones of the above-described type were provided for each customer as a part of the monthly rental fee for party line service from the telephone company.

Three combinations of party line ringing frequencies, known as harmonic, synchromonic and decimonic, are conventionally used by different telephone company central offices. The distinct ringing frequencies in the harmonic system are 16.66 Hz, 25 Hz, 33.33 Hz, 50 Hz and 66.66 Hz. The distinct ringing frequencies in the syncromonic system are 16 Hz, 30 Hz, 42 Hz, 54 Hz and 66 Hz. The distinct ringing frequencies in the decimonic system are 20 Hz, 30 Hz, 40 Hz, 50 Hz, and 60 Hz.

Party line ringing systems which use tuned ringing circuits are described in various United States Patents. U.S. Pat. No. 3,005,053 discloses a system for ringing substations by the transmission of particular tones applied in common to each of the substations. Each substation is selectively ringable by having a tone ringer which is tuned to a different resonant frequency. U.S. Pat. No. 3,026,377 discloses a party line ringing system which utilizes tuned relay circuits which resonate at a distinct resonant frequency at each subscriber station to permit the selective ringing of a subscriber station by a particular party line ringing frequency at the resonant frequency of that subscriber station.

SUMMARY OF THE INVENTION

The present invention is an interface circuit which is connected between a standard party line of the type which selectively rings customers by the generation of distinct ringing frequencies and a standard telephone which is designed to ring in response to a single standard ringing frequency of the type provided for non-party line use. With the interface circuit, a party line subscriber can purchase a standard telephone of the type which is connectable to a non-party line and connect that telephone to a party line which selectively rings subscribers by discrete party line ringing frequencies. The interface circuit is programmable to permit selection of any one of the standard party line ringing frequencies provided by the telephone company central office as the frequency to which the standard telephone will ring in response thereto. The interface circuit generates a ringing signal of the frequency that the standard telephone is designed to ring in response thereto upon receipt of the ringing frequency from the telephone company central office which has been selected by its programming. Moreover, the programmability of the interface to select any party line ringing frequency permits a standard design to be used to selectively ring a standard telephone in response to any of the discrete party line frequencies which are provided by the harmonic, syncromonic or decimonic ringing systems or any other frequency encoding system. Finally, the simplicity of the design of the interface circuit of the present invention permits its manufacture at low cost with conventional electronic components.

An interface circuit in accordance with the invention includes means for generating a ring command signal in response to the receipt of a party line ringing signal of a specified single frequency chosen from the group of possible ringing frequencies, the specified ringing frequency being programmable to change the single frequency which must be received from a telephone company central office to generate the ring command signal; and means for producing a single frequency ringing signal in response to the ring command signal.

In accordance with the invention, the means for generating a ring command signal may comprise detecting means for producing a pulsating output signal which has a frequency that is a function of the party line ringing signal frequency; counting means having a number of stages at least equal to the number of possible party line ringing frequencies which produces an output signal from a separate stage each time the output signal from the detecting means pulsates, the output signals from each of the stages occurring in separate time intervals, the duration of which is a function of the party line ringing frequency; switching means having a number of inputs equal to the number of outputs of the counting means, each input being coupled to a separate output of the counting means and having a single output, the switching means being programmable to select an output from a single stage of the counting means; and means coupled to the output of the switching means for holding the level of the signal from the selected stage when a control signal is applied to produce the ring command signal. The control signal may be produced by programmable pulse generating means for selectively producing a pulse in any one of a plurality of separate time intervals.

The programmable pulse generating means includes means for producing an oscillating electrical signal of constant frequency; a dividing means having a plurality of outputs equal to the number of separate time intervals, the dividing means being coupled to the means for producing an electrical signal of constant frequency; means for resetting the dividing means in response to the initial detection of a party line ringing signal; and programmable switching means coupled between the outputs of the dividing means and the means for holding which is programmable to permit selection of a single pulse for application to the means for holding. The means for holding may be a one-shot multivibrator.

The means for producing a single frequency ringing signal comprises an oscillator coupled to the means for generating the ring command signal for producing a signal at the single frequency of the ringing signal in response to the ring command signal; and a chopper coupled to the oscillator for generating the ring command signal for producing a chopped signal of the same frequency as the oscillator for producing a single frequency ringing signal, the chopped signal having an amplitude sufficient to activate the ringing mechanism of an individual party line subscriber's telephone.

Further in accordance with the invention, means are provided for resetting the counting means and the holding means after the elapsing of a time interval measured from the first detection of a party line ringing signal. The means for resetting comprises means for rectifying a party line ringing signal; means coupled to the means for rectifying for producing a pulse after the rectified voltage has been integrated to reach a threshold level; and a one-shot multivibrator coupled to the means for producing a pulse for producing the reset pulse for the counting means and the holding means.

As used herein, standard telephone means a telephone designed for connection to a balanced line servicing one subscriber which is rung by a ringing signal of a standard frequency such as 20 Hz.

BRIEF DESCRIPTION OF THE DRAWINGS

FIG. 1 is a system schematic of the present invention.

FIG. 2 is an oscillogram of various signals utilized in the system schematic of FIG. 1.

DESCRIPTION OF THE PREFERRED EMBODIMENT

Figure 3:
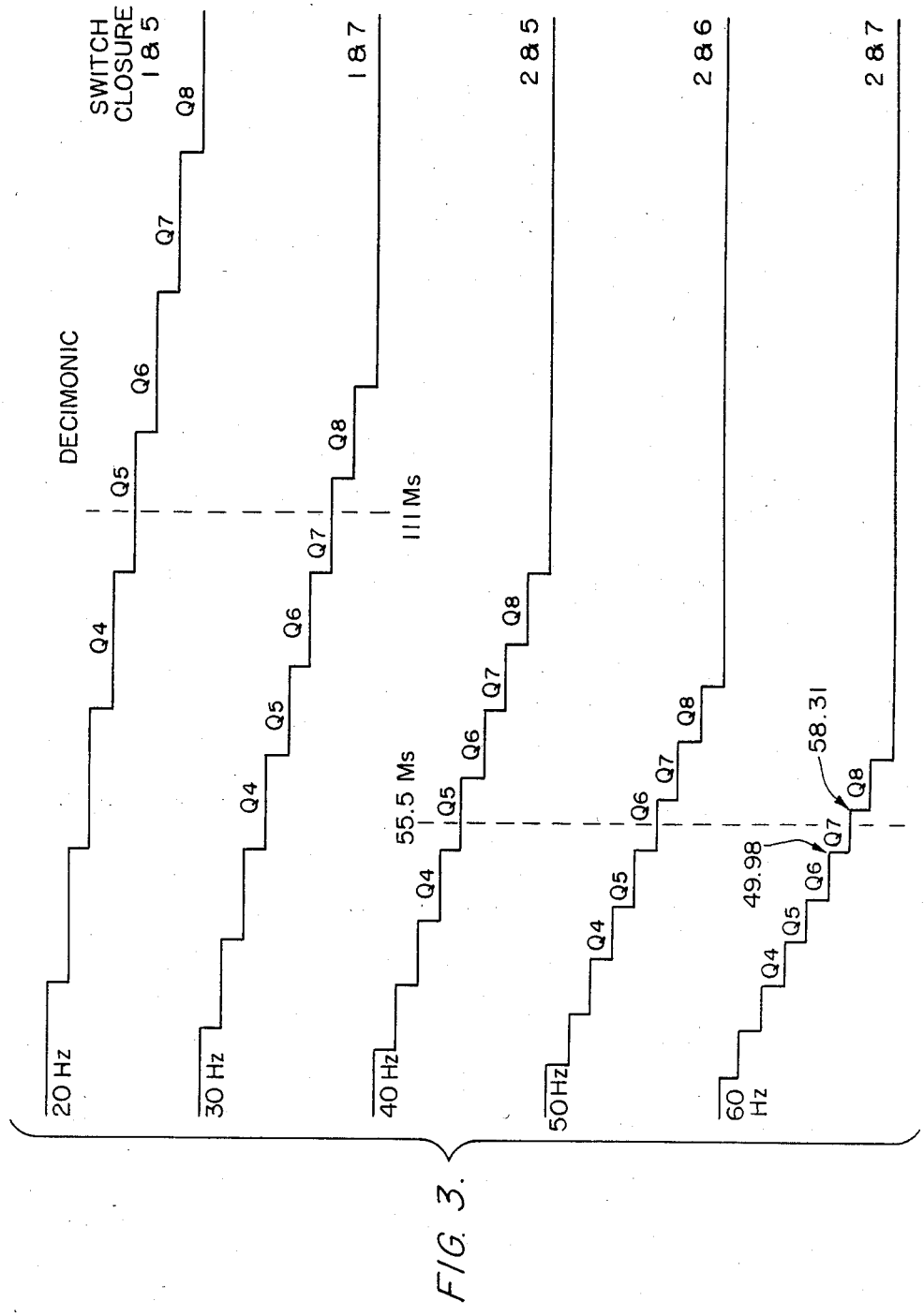
FIG. 3 is an illustration of program switching conditions required to generate a ring command signal in response to the different party line ringing frequencies in the decimonic system.

FIG. 1 illustrates a party line system 10 having a telephone company central office 12 which provides a party line 14 to which is applied party line ringing signals of selected frequencies to activate the telephones of subscriber's connected to the party line. Each subscriber is assigned a separate ringing frequency by the telephone company central office 12. An interface circuit 16 in accordance with the invention is connected between the party line 14 and a standard two-wire balanced telephone 18 which includes a ringing circuit 20 designed to ring in response to a single frequency standard ringing signal such as 20 Hz. The interface circuit 16 of the present invention functions to provide a ringing signal of the standard ringing frequency for telephone 18 when a ringing frequency is received which the interface circuit is programmed to generate a standard ringing signal in response thereto.

The programmability of the interface circuit is an important aspect of the invention for the reason that it permits a single interface circuit 16 to be purchased by a party line subscriber for use on any frequency based party line ringing system. The interface circuit 16 contains one or more switches which are programmable by the subscriber to select the single party line ringing frequency in response to which the interface circuit will generate the single standard ringing frequency signal for a standard telephone. Thus, the purchaser of a standard telephone desiring to connect it to a party line having a frequency based ringing system needs only to connect the interface circuit 16 to the "tip" and "ring" lines provided by the telephone company central office 12 which are contained in line 14 and to further program the party line ringing frequency which has been assigned to that subscriber by the telephone company central office.

The first function of the telephone interface circuit 16 is performed by full wave bridge 22 which rectifies the sinusoidal party line ringing signal of any one of the possible frequencies which is provided by the telephone company central office 12. The output of the full wave bridge circuit 22 is a series of pulses of twice the frequency of the party line ringing signal provided by the central office. Full wave bridge 23 provides a DC path for the talking circuit between the subscriber telephone 18 and the telephone central office when the phone is off hook. The pulsating output signal from the full wave bridge circuit 22 is applied on line 24 to a voltage regulator 26 and to a wave shaper 28. The wave shaper 28, which may be a Schmitt trigger or other squaring-type circuit, produces a series of rectangular pulses of twice the fundamental frequency of the party line ringing signal. The output of the wave shaping circuit 28 is applied to a counter 30 as a clock signal. The programming of the switches 42 associated with the counter 30 is described in detail, infra. A detailed explanation of the effect of the application of a pulsating output signal on the voltage regulator 26 is described in detail, infra, in FIG. 6. The voltage regulator 26 functions to produce a signal which activates one-shot multivibrator 32 after the rectified party line ringing signal has reached a threshold. The one-shot multivibrator 32 produces a 30 millisecond pulse which is used for resetting programmable counter 30 and "D"-type flip-flop 34.

The counter 30, "D"-type flip-flop 34, an oscillator 36, and divider 38 function to generate a ring command signal on the "Q" output of flip-flop 34 in response to the receipt of a party line ringing signal of the programmed single frequency and a clock signal produced by the divider 38. The divider 38 is driven by keyed oscillator 36 to sequentially produce time separated output pulses at three different stages of the divider which are present, as measured from a zero time base, 41.62 milliseconds at the lowest stage output from the divider, 55.5 milliseconds at the intermediate stage output from the divider and 111 milliseconds at the highest stage output from the divider. The oscillator is turned off in response to the output signal f of the flip-flop 34 which is applied through diode 39. Three separate switches 40 are disposed between the aforementioned output stages of the divider and a common line which is connected to the clock input of flip-flop 34 to permit the selection of a single one of the aforementioned output pulses as a clock signal. The programming of the switches 40 is described, infra. The counter 30 has a plurality of output stages upon which outputs occur sequentially with the application of each successive clock pulse. The number of output stages is equal in number to the number of possible ringing frequencies used by the telephone company central office. The counter 30 functions to sequentially shift a high level signal through the successive outputs Q4–Q8. These outputs are illustrated in the oscillograms of FIG. 2 which are identified by the corresponding Q4-Q8 legends. In use, only one of the switches 42 is closed to cause only one of the pulses produced on the outputs Q4-Q8 to be coupled to the "D" input of the flip-flop 34. Programming of the party line interface 16 to respond to a particular one of the possible party line ringing frequencies provided by the telephone company central office 12 is accomplished by closing one of the switches 42 associated with the counter 30 and one of the switches 40 associated with the divider 38 in a manner described in detail in conjunction with Figures 3-5.

The ring command signal identified in FIG. 2 as "F", which is produced by the output "Q" of the flip-flop 34, activates the circuitry for generating a single standard ringing frequency. The ring command signal "F" is applied to oscillator 44 which is designed to oscillate at a standard non-party line ringing frequency such as 20 Hz. After the ring command signal "F" goes high, it stays high until cessation of the ringing signal occurring after two seconds as identified in oscillogram "A" of FIG. 2. The oscillator 44 is coupled to a chopper 46 which produces a chopped output signal for application to the telephone ringer within the standard telephone 20. The amplitude of the output signal from the chopper 46 must be sufficient to activate the ringing mechanism. The chopper 46 follows the oscillation frequency of the oscillator 44. Bipolar transistor 48 and capacitor 50 function as a DC power supply for the chopper 46 upon the generation of the ring command signal "F".

Figure 6:
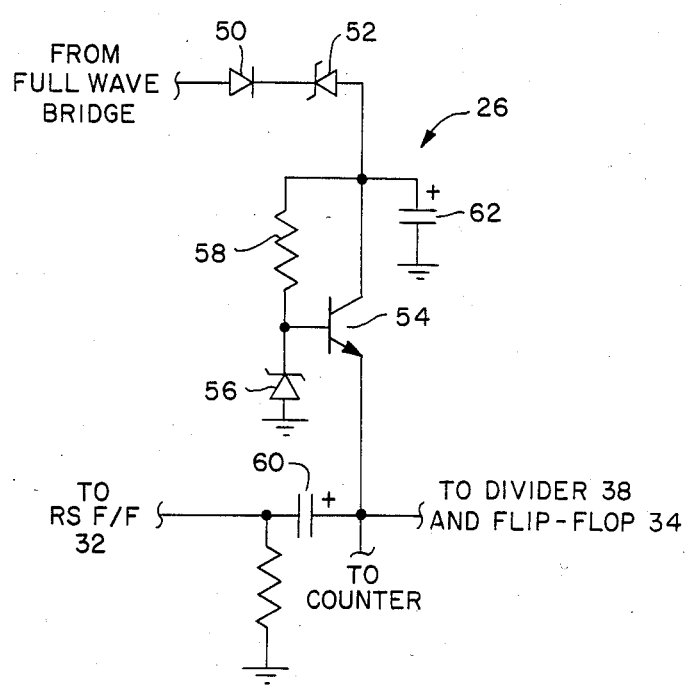
FIG. 6 is a circuit diagram of the voltage regulator of FIG. 1.

FIG. 6 illustrates the voltage regulator 26 of FIG. 1. The voltage regulator 26 performs two functions which are to activate the one-shot multivibrator 32 in generating the reset pulses for the counter 30 and the flip-flop 34 and to provide power for the operation of the counter, flip-flop 34 and divider 38 in generating the ring command signal. The voltage regulator is coupled to the positive side of the full wave bridge 22 through diode 50 and Zener diode 52. The function of the diode 50 and Zener diode 52 is to pass the ringing voltage while rejecting passage of dial pulses and voice communications which have potentials lower than the Zener potential. Transistor 54 establishes a regulated potential at the emitter by clamping the base with Zener diode 56. Resistor 58 establishes proper bias potential between the collector and emitter circuits of transistor 54. The emitter of transistor 54 is connected to capacitor 60 which functions as an integration circuit for the pulses passed by the full wave bridge 22. Once the capacitor 60 has charged up past a threshold, the one-shot multivibrator 32 changes into its astable state producing the 30 millisecond reset pulse identified by legend "C" in FIG. 2. A second capacitor 62 is coupled between the collector circuit and ground which establishes the required bias for the operation of the integrated circuits used for implementing the counter 30, the flip-flop 34 and divider 38. The RC time constant associated with capacitor 62 is such that the voltage decays almost immediately after the cessation of the party line ring frequency to a level insufficient to provide operating potential for counter 30, flip-flop 34 and divider 38. The counter 30, flip-flop 34 and divider 38 are then not operational again until the ringing signal again appears.

Figure 4:
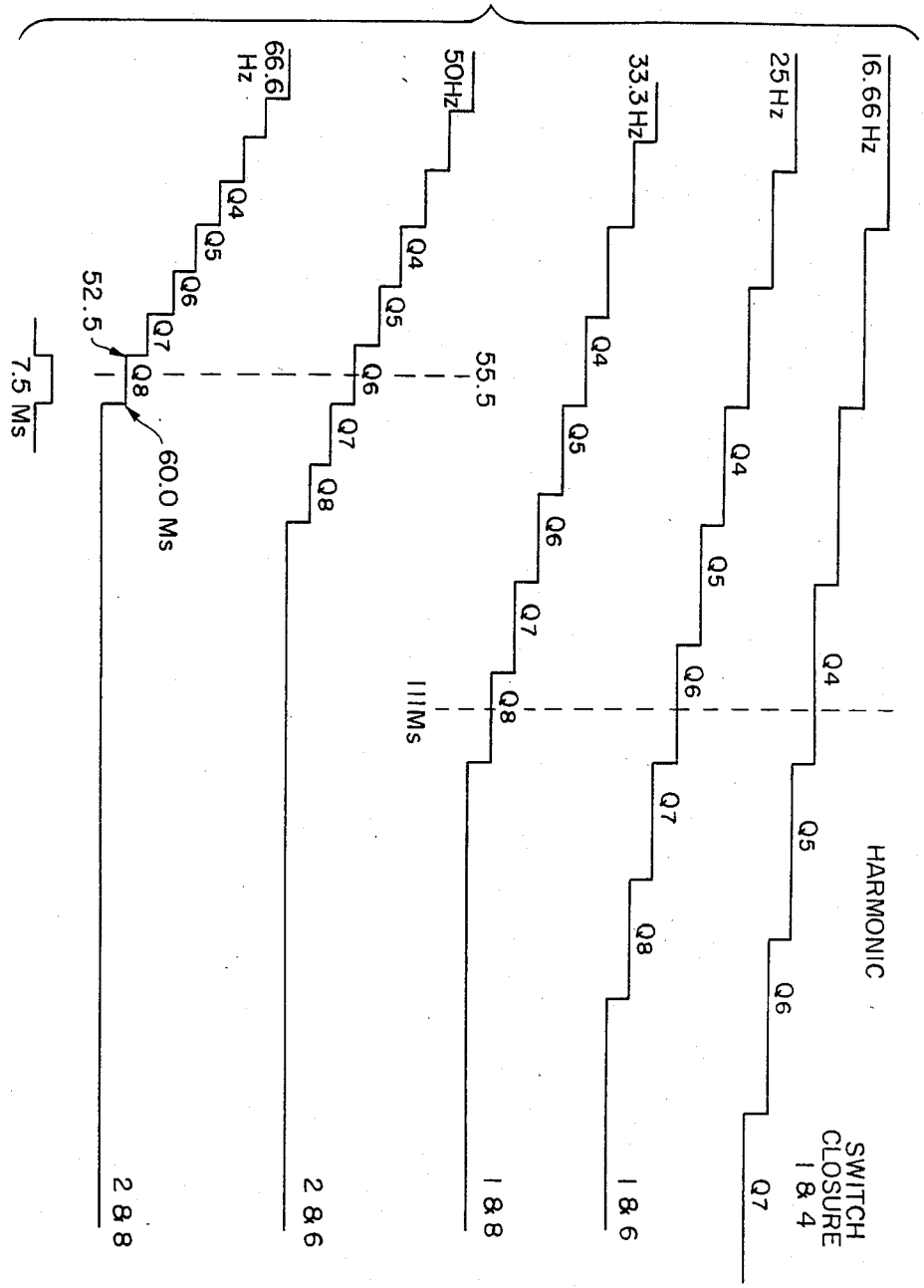
FIG. 4 is an illustration of program switching conditions required to generate a ring command signal in response to the different party line ringing frequencies in the harmonic system.
Figure 5:
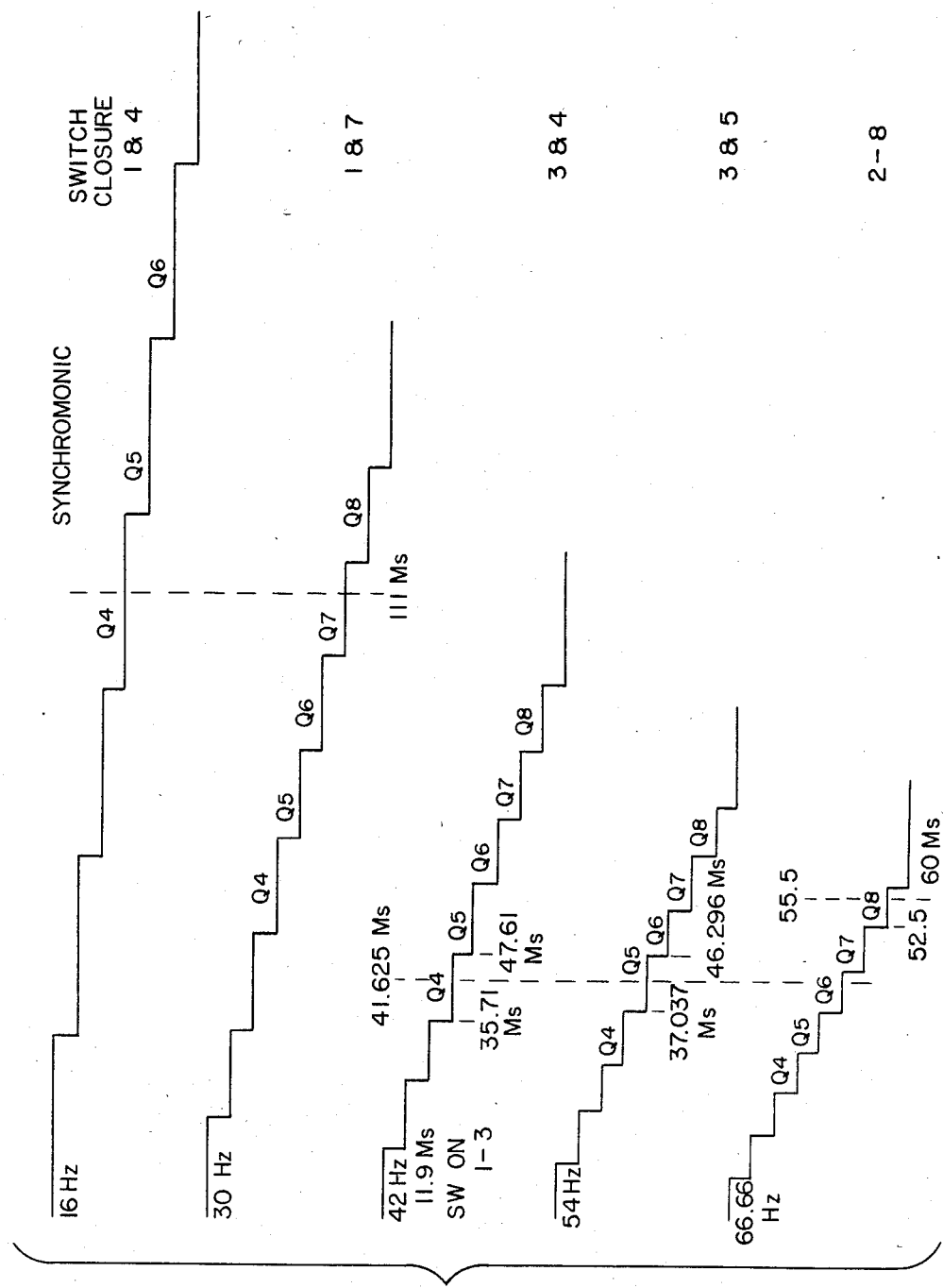
FIG. 5. is an illustration of program switching conditions required to generate a ring command signal in response to the different party line ringing frequencies in the syncromonic system.

FIGS. 3, 4 and 5 respectively illustrate the switch positions for the switches 42 associated with counter 30 and for the switches 40 associated with the divider 38 to produce a ring command signal for the party line ringing frequencies of the decimonic, harmonic and syncromonic systems. It should be understood that a party line subscriber needs only to close one switch associated with the counter 30 and divider 38 once the subscriber knows the frequency assigned by the central office 12 at which the party line interface should ring. FIGS. 3, 4 and 5 suggestively illustrate, by means of staircase waveforms, the occurrence of high level output signals successively on different outputs Q4-Q8 of the programmable counter 30. In actuality, all of the waveforms are of the same amplitude. A correlation of a particular staircase with an output on one of the outputs Q4-Q8 of the programmable counter is made by the placement of that output as a legend on top of the staircase waveform during which the output occurs.

FIG. 3 illustrates the combination of switch closures for the counter 30 and divider 38 for choosing the generation of a ring command signal in response to a 20 Hz, 30 Hz, 40 Hz, 50 Hz or 60 Hz party line ringing frequency provided by the telephone company central office 12 in a decimonic system. For 20 Hz operation, switch 1 of the divider 38 and switch 5 of the counter 30 is closed. For 30 Hz operation, switch 1 of the divider 38 and switch 7 of the programmable counter 30 is closed. For 40 Hz operation, switch 2 of the divider 38 and switch 5 of the counter 30 is closed. For 50 Hz operation, switch 2 of the divider 38 and switch 6 of the counter 30 is closed. For 60 Hz operation, switch 2 of the divider 38 and switch 7 of the counter 30 is closed. An output is produced for each of the different frequencies when there is time coincidence between a signal produced by one of the outputs Q4-Q8 of the counter 30 and the presence of an output on one of the outputs of the divider 38. When a clock pulse is present at the flip-flop 34 at the same time that data represented by one of the output waveforms Q4-Q8 is present at the "D" input of the flip-flop, the "Q" output goes high and remains in that state until the two second ringing signal "A" of FIG. 2 is complete.

FIG. 4 illustrates the combination of switch closures for the counter 30 and the divider 38 for choosing the generation of a ring command signal in response to the harmonic party line ringing system utilizing ringing frequencies of 16.66 Hz, 25 Hz, 33.33 Hz, 50 Hz or 66.66 Hz. For 16.66 Hz operation, switch 1 of the divider 38 and switch 4 of the counter 30 are closed. For 25 Hz operation, switch 1 of the divider 38 and switch 6 of the programmable counter 30 are closed. For 33.33 Hz operation, switch 1 of the divider 38 and switch 8 of the counter 30 are closed. For 50 Hz operation, switch 2 of the divider 38 and switch 6 of the counter 30 are closed. For 66.66 Hz operation, switch 2 of the divider 38 and switch 8 of the counter 30 are closed. Like the decimonic system described, supra, with regard to FIG. 3, time coincidence between signal outputs from the divider 38 and the counter 30 is required to produce a high level ring command signal "F".

FIG. 5 illustrates the combination of switch closures for the counter 30 and the divider 38 for choosing the generation of a ring command signal in response to a 16 Hz, 30 Hz, 42 Hz, 54 Hz or 66.66 Hz party line ringing frequency provided by the telephone company central office 12 in a synchromonic system. For 16 Hz operation, switch 1 of the divider 38 and switch 4 of the counter 30 are closed. For 30 Hz operation, switch 1 of the divider 38 and switch 7 of the counter 30 are closed. For 42 Hz operation, switch 3 of the divider 38 and switch 4 of the counter 30 are closed. For 54 Hz operation, switch 3 of the divider 38 and switch 5 of the counter 30 are closed. For 66.66 Hz operation, switch 2 of the divider 38 and switch 8 of the counter 30 are closed. Like the situation with decimonic and syncromonic operation described above, a ring command signal is produced when there is time coincidence between a signal applied to the clock of the flip-flop 34 from the divider 38 and to the "D" input of the flip-flop 34 from the counter 30.

OPERATION

The operation of the programmable interface is as follows. It is assumed that the switches 40 of the divider 38 and the switches 42 of the counter 30 have been closed in one of the combinations described above with reference to FIGS. 3–5 to generate a ring command signal "F" in response to the presence of a particular party line ringing signal frequency. For purposes of discussion, it is assumed that the interface 16 is programmed to generate a ring command signal in response to a 20 Hz party line ringing frequency in a decimonic system. In accordance with FIG. 3, switch 1 of the divider 38 and switch 5 of the counter 30 are closed. When the telephone company central office 12 receives a phone call for a subscriber who is assigned the 20 Hz decimonic ringing frequency, the ringing frequency identified by waveform "A" of FIG. 2 is transmitted along the tip and ring lines to the full wave bridge 22 where it is rectified to produce a pulsating output on line 24. The pulses on line 24 are integrated by the capacitor 60 of FIG. 6 to a point where the threshold for keying on the one-shot multivibrator 32 is exceeded to cause the generation of a 30 millisecond astable state. The 30 millisecond astable state is illustrated as waveform "C" of FIG. 2. The wave shaping circuit 28 causes the squaring of the pulses to produce an output signal of a waveform of rectangular shape having a frequency twice the fundamental frequency of the party line ringing signal. The astable high level output of the one-shot multivibrator 32 causes the resetting of the counter 30 and the flip-flop 34. Upon reset, a high level signal is generated on the output line "Q0" as indicated in FIG. 2. Upon the receipt of the next pulse from the wave shaper 28 after the reset signal goes low, the oscillator 36 is keyed into oscillation. The preferred frequency of the oscillator is 36.9 KHz although other frequencies may be chosen. The divider starts to divide the fundamental frequency of the oscillator 36 to sequentially cause output signals to be present on the outputs from the divider at time intervals measured from the beginning time of oscillation of 41.62 milliseconds, 55.5 milliseconds and 111 milliseconds. Because of the closure of switch 1, a signal will be present on the line coupled to the clock of the flip-flop 34 at 111 milliseconds. At the same time, the counter 30 counts the series of output pulses from the wave shaper 28 to sequentially cause output signals to appear on outputs Q4–Q8 in sequence as illustrated in outputs "Q4–Q8" of FIG. 2. The closure of switch 5 causes an output to be present from the closed switch associated with Q5 during the 111 millisecond time interval as illustrated in FIG. 3. Because of the simultaneous presence of a clock pulse and high level data on the "D" input of the flip-flop 34, the flip-flop changes state to produce a high level signal on the "Q" output to produce the ring command signal "F". The ring command signal is fed back to the oscillator 36 via diode 60 to stop the oscillator 36 from further driving the divider 34. The stopping of oscillation removes the high level signal present on the switch associated with a 111 millisecond output time interval to disable the clock to insure that a high level signal is present on the "Q" output from the flip-flop 34 until the flip-flop is reset which occurs after the ringing frequency ceases. The ring command signal is applied to the transistor 48 and capacitor 50 to provide power for the operation of the chopper 46. The ring command signal also keys the operation of the oscillator 44 which generates the fundamental frequency for ringing the ringing circuit 20 of a standard two-wire balanced telephone 18. The oscillator 44 and chopper 46 continue to produce the ringing signal until the expiration of the two second interval marking the end of the ringing signal produced by the telephone company central office 12. When the ringing signal ceases, the charge stored on capacitor 62 decays exponentially in accordance with the RC time constant of the capacitance and associated system resistance quickly to a level where the counter 30, flip-flop 34 and divider 38 cease to function. The power for the chopper 46 stored in capacitor 50 is quickly dissipated because of the RC time constant which causes ringing to immediately stop. The next ringing signal received from the telephone company central office starts the operation over as explained above.

While the system operation has been described specifically with regard to a particular party line ringing frequency in a decimonic system, it should be understood that its operation with other party line ringing frequencies of the harmonic and syncromonic systems or other party line ringing frequency system is identical. Any combination of party line ringing frequencies may be designed into the system by the appropriate choice of output pulses produced by the divider 38 within specified time intervals to insure the presence of a clock pulse being applied to the flip-flop 34 when a high level signal is also present on the "D" input to the flip-flop.

While the invention has been described in terms of its preferred embodiment, it should be understood by those skilled in the art that numerous modifications may be made thereto without departing from the spirit and scope of the invention as defined in the appended claims. It is intended that all such modifications fall within the scope of the claims.

What I claim as my invention is:

1. A party line interface for connection at a party line subscriber's location between a party line connected to a central telephone office which provides a party line ringing signal of a different frequency to selectively ring each individual party line subscriber's telephone connected to the party line and a standard telephone which rings in response to the application of a single standard ringing frequency signal comprising:
    (a) means for generating a ring command signal in response to the detection of a party line ringing signal of a single frequency, and being programmable to change the single frequency which must be detected to generate the ring command signal; and
    (b) means for producing the single standard ringing frequency signal in response to the ring command signal.

2. A party line interface in accordance with claim 1 wherein said means for generating a ring command signal functions to detect the ringing signal of single frequency by detecting the time coincidence between a first signal which is a function of the ringing frequency and a control signal which is programmable to occur in different time intervals measured from the occurrence of the ringing signal.

3. A party line interface in accordance with claim 2 wherein the different party line frequencies are 20 Hz, 30 Hz, 40 Hz, 50 Hz and 60 Hz and the ringing frequency is 20 Hz.

4. A party line interface in accordance with claim 2 wherein the different party line frequencies are 16.66 Hz, 25 Hz, 33.3 Hz, 50 Hz and 66.66 Hz and the ringing frequency is 20 Hz.

5. A party line interface in accordance with claim 2 wherein the different party line frequencies are 16 Hz, 30 Hz, 42 Hz, 54 Hz and 66.66 Hz and the ringing frequency is 20 Hz.

6. A party line interface for connection at a party line subscriber's location between a party line connected to a central telephone office which provides a party line ringing signal of a different frequency to selectively ring each individual party line subscriber's telephone connected to the party and a standard telephone which rings in response to the application of a single standard ringing frequency signal comprising:
(a) means for generating a ring command signal in response to the detection of a party line ringing signal of a single frequency, and being programmable to change the single frequency which must be detected to generate the ring command signal; said means for generating a ring command signal comprising:
(i) detecting means for producing a pulsating output signal which has a frequency that is a function of the party line ringing signal frequency;
(ii) counting means having a number of stages at least equal to the number of possible party line ringing frequencies which produces an output signal from a separate stage each time the output signal from the detecting means produces a pulse, the output signals occurring in separate time intervals the duration of which is a function of the party line ringing frequency;
(iii) switching means having a number of inputs equal to the number of stages of the counting means, each input being coupled to a separate stage of the counting means and having a single output, the switching means being programmable to select an output from a single stage of the counting means; and
(iv) means coupled to the output of the switching means for holding the level of the signal from the selected stage when a control signal is applied to produce said ring command signal; and
(b) means for producing the single standard ringing frequency signal in response to the ring command signal.

7. A party line interface in accordance with claim 6 wherein said control signal is produced by programmable pulse generating means for selectively producing one of a plurality of time separated pulses.

8. A party line interface in accordance with claim 7 wherein said programmable pulse generating means includes:
(a) means for producing an oscillating electrical signal of constant frequency;
(b) dividing means having a plurality of outputs equal to the number of time separated pulses, the dividing means being coupled to the means for producing an oscillating electrical signal;
(c) means for resetting said dividing means in response to the initial detection of a party line ringing signal; and
(d) programmable switching means coupled between the outputs of said dividing means and the means for holding which is programmable to permit selection of said time separated pulse for application to said means for holding.

9. A party line interface in accordance with claim 8 wherein said means for holding is a one-shot multivibrator.

10. A party line interface in accordance with claim 6 wherein the means for producing the single standard frequency ringing frequency signal comprises:
(a) ringing signal oscillator means coupled to the means for generating the ring command signal for producing a signal at the single standard frequency in response to the ring command signal; and
(b) a chopper coupled to the ringing signal oscillator means for producing the single standard ringing frequency signal with an amplitude sufficient to activate the ringing mechanism of an individual party line subscriber's telephone.

11. A party line interface circuit in accordance with claim 6 further comprising means for resetting the counting means and the holding means after the elapsing of a time interval measured from the first detection of a party line ringing signal.

12. A party line interface circuit in accordance with claim 11 wherein said means for resetting comprises:
(a) means for rectifying the party line ringing signal;
(b) means coupled to the means for rectifying for producing a pulse after the rectified voltage has been integrated to reach a threshold level; and
(c) a one-shot multivibrator coupled to the means for producing a pulse for producing the reset pulse for the counting means and the holding means.

13. A party line interface for connection at a party line subscriber's location between a party line connected to a central telephone office which provides a party line ringing signal of a different frequency to selectively ring each individual party line subscriber's telephone connected to the party line and a standard telephone which rings in response to the application of a single standard ringing frequency signal comprising:
(a) means for generating a ring command signal in response to the detection of a party line ringing signal of a single frequency, and being programmable to change the single frequency which must be detected to generate the ring command signal; said means for generating a ring command signal comprising:
(i) detecting means for producing a pulsating output signal which has a frequency that is a function of the party line ringing signal frequency;
(ii) means responsive to the pulsating output signal for producing a control signal delayed from the beginning of the pulsating signal, the delay being programmable to select the time interval during which the control signal is generated;
(iii) means responsive to the pulsating signal for producing an output signal during one of a plurality of cycles of the pulsating signal, the cycle during which the output signal is produced being programmable; and
(iv) means responsive to the control signal and the output signal for producing the ring command signal when the control signal and the output signal are time coincident; and
(b) means for producing the single standard ringing frequency signal in response to the ring command signal.

* * * * *